Sept. 2, 1941.   D. J. HOLLERAN   2,254,288
SCREW ASSEMBLY FOR ELECTRICAL APPARATUS
Filed April 18, 1939
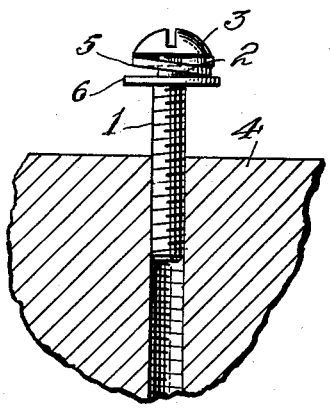
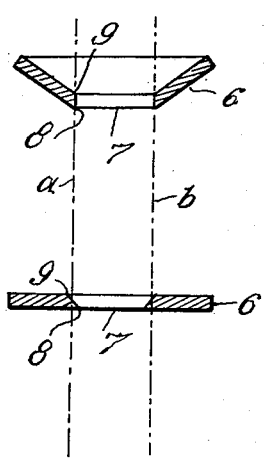
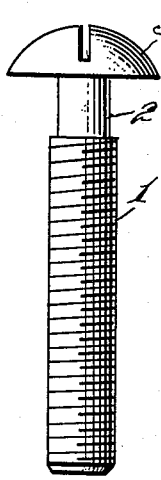
INVENTOR
Dominic J. Holleran,
BY
A. D. T. Libby
ATTORNEY Patented Sept. 2, 1941

2,254,288

UNITED STATES PATENT OFFICE 2,254,288

SCREW ASSEMBLY FOR ELECTRICAL APPARATUS

Dominic J. Holleran, Irvington, N. J., assignor to The National Lock Washer Company, Newark, N. J.

Application April 18, 1939, Serial No. 268,581

2 Claims. (Cl. 151—35)

This invention relates to a screw assembly which is especially adapted for use in connection with electrical fittings.

In such devices it has been customary in the past to use an ordinary flat washer under the head of the screw for making engagement with the end of an electrical conductor which is wound around the screw; or to make engagement with a terminal to which the electrical conductor may be attached. Such connections, however, are apt to become loose, particularly on structures or devices that are subjected to mechanical vibration. Furthermore, the use of a plain flat washer under the head of the screw requires, when connection is being made at the screw, that the washer be lifted up either between the fingers or with a screw-driver in order to pass the wire or terminal thereunder. In many cases, screws having such plain washers are located where they are not always easy to get at.

I am aware of the fact that it has been proposed to provide the screw with a washer in which the washer is formed into a cup shape after it has been made in order to enlarge the hole in the washer sufficiently so that the same may be passed over the threaded portion of the screw onto the shank portion of the screw adjacent the head, this latter part being smaller in diameter than the outside diameter of the threaded portion of the screw.

Then, after the washer is moved into this position with the cup formation extending toward the entering end of the screw, the washer is flattened on the shank so that when the screw, in use on any device, is backed out, it will automatically carry the washer with it, it being understood that the washer is free to turn on the shank portion of the screw. This prior art construction has some advantages, yet it does not take care of the most important point which is the loosening of the screw, thereby producing a loose joint and in some cases an open circuit, thus allowing the wire to slip from under the screw.

To overcome all the disadvantages of the prior art construction, I propose the use of a lock washer immediately under the head of the screw on the shank portion thereof, together with a washer constructed in a different manner from what has been heretofore proposed, for the reasons which will be hereinafter set forth.

In other words, it is the object of my present invention to provide an article of manufacture or commerce comprising a screw and a pair of washers, one of which is of the locking type, that will overcome all of the objections heretofore stated.

Referring to the drawing:

Figure 1 shows an assembled view of the screw fitting some hole made to receive it.

Figure 2 is a view of the screw shown in Figure 1, but on an enlarged scale.

Figure 3 is a view of the clamping washer as manufactured, ready for assembly on the screw.

Figure 4 is an enlarged view of the washer shown in Figure 3, but flattened to the position, after its assembly, as in Figure 1.

The screw itself comprises a threaded portion 1 and a shank 2 of smaller diameter which is located adjacent the head 3. The clamping washer 6 is first made cup-shaped and then it is pierced or perforated with a hole 7, thereby providing a hole of uniform diameter; that is to say, the points 8 and 9 around the periphery of the hole are on the lines $a$ and $b$. The hole 7 is made materially larger than the outside diameter of the threaded portion 1 of the screw.

By way of illustration but not of limitation, a 6/32 machine screw has an outside diameter of the threads of approximately .137″. The shank 2 is made with a diameter of approximately .107″. The hole 7 in the washer 6 for this size screw is made with a diameter of .145″, giving a clearance of .008″ which provides a very easy and quick assembly of the washer over the threaded part of the screw.

After the cup washer 6 has been made as shown in Figure 3, a lock washer 5 is slipped over the threaded portion 1 of the screw onto the shank portion 2, and then the cup washer 6 is passed over the threaded portion 1 onto the shank 2, preferably with the cup portion 6 pointing upwardly toward the head of the screw, after which the washer 6 is flattened to the position shown in Figures 1 and 4. In the flattening operation, the point or circular edge 8 of the washer is forced toward the axial center of the washer and screw, while the circular edge 9 will move but slightly away from the reference lines $a$ and $b$. This reduces the hole from approximately .145″ to .110″, allowing the washer 6 to turn on the shank of the screw, but presenting a formation toward the thread which will prevent the washer from moving onto the thread.

By this arrangement, when the screw is backed out of the member 4, as in Figure 1, the washers 5 and 6 are carried with the screw, allowing the wire or terminal to be passed freely under the holding or clamping washer 6. When the screw is tightened into locking position, the lock washer will prevent the screw from loosening under all conditions of operation.

From what has been said, it will be seen that

I have provided an article of manufacture and commerce which will overcome all the objections of prior art constructions.

What I claim is:

1. An article of manufacture comprising a screw having a head, a shank portion adjacent the head and a threaded portion extending from the shank to the entering end of the screw, the threaded portion being larger in diameter than the shank portion, a lock washer on the shank next to the head and a flat contact-making washer between the lock washer and the beginning of the threaded portion, the flat washer per se being initially cup-shaped and having a hole of uniform diameter therein for freely passing over the threaded portion of the screw, the hole in the washer, when in working position on the screw, being then non-uniform in diameter with the hole edge toward the threads on the screw being smaller in diameter than the hole edge toward the head of the screw to secure more positive positioning means of the washer on the screw.

2. An article of commerce comprising a screw having a head and threads extending from the end of the screw to a point near the head, the threaded portion being larger in diameter than the portion between the head and the part where the threads begin, a spring lock washer next to the head and a relatively stiff metallic holding washer positioned on that portion immediately adjacent the lock washer, the holding washer having a hole, the diameter of which on one edge is substantially less than the threaded part of the screw and fitting around the unthreaded part thereof.

DOMINIC J. HOLLERAN.